United States Patent [19]

Tamai et al.

[11] Patent Number: 5,506,462
[45] Date of Patent: Apr. 9, 1996

[54] VIBRATION MOTOR

[75] Inventors: Jun Tamai, Yokohama; Maki Saito, Kawasaki; Shunichi Nakahara, Yokohama, all of Japan

[73] Assignee: Canon Kabushiki Kaisha, Tokyo, Japan

[21] Appl. No.: 123,205

[22] Filed: Sep. 20, 1993

Related U.S. Application Data

[60] Continuation of Ser. No. 836,977, Feb. 19, 1992, abandoned, which is a division of Ser. No. 548,673, Jul. 5, 1990, Pat. No. 5,124,611.

[30] Foreign Application Priority Data

Jul. 5, 1989 [JP] Japan .................................. 1-173528

[51] Int. Cl.$^6$ ....................................................... H01L 41/08
[52] U.S. Cl. ............................................. 310/328; 310/323
[58] Field of Search ................................... 310/323, 328; 318/114; 198/624; 101/36

[56] References Cited

U.S. PATENT DOCUMENTS

| | | | |
|---|---|---|---|
| 4,281,987 | 8/1981 | Kleesattel | 433/103 |
| 4,562,374 | 12/1985 | Sashida | 310/328 |
| 4,634,916 | 1/1987 | Okada et al. | 310/323 |
| 4,642,509 | 2/1987 | Kumada | 310/323 |
| 4,663,556 | 5/1987 | Kumada | 310/323 |
| 4,728,843 | 3/1988 | Mishiro | 310/323 |
| 4,764,702 | 8/1988 | Mishiro | 310/323 |
| 4,814,660 | 3/1989 | Yamada et al. | 310/328 |
| 4,829,209 | 5/1989 | Kawasaki et al. | 310/323 |
| 4,853,578 | 8/1989 | Takahashi et al. | 310/315 |
| 4,866,326 | 9/1989 | Niikawa et al. | 310/315 |
| 4,928,030 | 5/1990 | Culp | 310/328 |
| 4,933,590 | 6/1990 | Inoue et al. | 310/323 |
| 4,947,076 | 8/1990 | Kumada | 310/323 |
| 4,965,482 | 10/1990 | Ohinishi et al. | 310/323 |
| 4,975,614 | 12/1990 | Honda | 310/323 |
| 5,051,647 | 9/1991 | Uchikawa et al. | 310/323 |
| 5,124,611 | 6/1992 | Tamai et al. | 310/317 |
| 5,162,692 | 11/1992 | Fujimura | 310/323 |

FOREIGN PATENT DOCUMENTS

| | | |
|---|---|---|
| 0301429 | 2/1989 | European Pat. Off. |
| 0301529 | 2/1989 | European Pat. Off. |
| 0401762 | 12/1990 | European Pat. Off. |

Primary Examiner—Clayton E. LaBalle
Attorney, Agent, or Firm—Fitzpatrick, Cella, Harper & Scinto

[57] ABSTRACT

Disclosed is a motor having a rotor driven by a vibrator generating a vibration of rope skipping motion. The rotor has a friction portion which is in contact with the friction portion of the vibrator so as to be given the vibration of rope skipping motion by the friction portion of the vibrator, and a supporting portion which is provided at a position spaced apart from the friction portion and which is in contact with a portion of the vibrator. Thus, the motor is constructed compactly.

29 Claims, 8 Drawing Sheets

VIBRATION MOTOR

This application is a continuation of application Ser. No. 07/836,977 filed Feb. 19, 1992, now abandoned, which is a division of application Ser. No. 07/548,673 filed Jul. 5, 1990 now U.S. Pat. No. 5,124,611.

BACKGROUND OF THE INVENTION

1. Field of the Invention

This invention relates to a motor generating mechanical power without resorting to an electromagnetic force, and in particular to a motor which utilizes a circular motion excited in a vibrator by the combination of expansion and contraction vibrations in the axial direction to rotate a driven member coaxially fitted to the vibrator by frictional driving.

2. Related Background Art

Vibrators of this kind are disclosed, for example, in Japanese Patent Laid-Open Application No. 62-141980 and Japanese Patent Laid-Open Application No. 63-214381.

Such a vibrator, as shown in FIG. 12 of the accompanying drawings, comprises a vibration member 100 comprising a metallic round bar of cone-like shape the outer diameter of whose base portion gradually decreases toward the fore end portion, a circular ring-like metallic keep member 101 having an outer diameter equal to that of the large-diameter portion of the vibration member 100, and two electrostrictive element plates 102, 103 as electromechanical energy conversion elements formed into a circular ring-like shape and disposed between the vibration member 100 and the keep member 101, the keep member 101 being fixed to the vibration member 100 by a bolt 104, the electrostrictive element plates 102 and 103 being urged against each other and held thereby. The electrostrictive element plates 102 and 103 each have on one surface thereof two electrodes differing in the direction of polarization from each other and formed symmetrically divisionally and have a common electrode on the other surface thereof, and are disposed with a positional phase of 90° each and with the divisional electrode side as the front side. Between the electrostrictive element plates 102 and 103, there are disposed electrode plates 105 and 106 which are in contact with the divisional electrodes of the rearward electrostrictive element plate 103 and the common electrode of the forward electrostrictive element plate 102, and the divisional electrodes of the forward electrostrictive element plate 102 are in contact with the vibration member 100 and the common electrode of the rearward electrostrictive element plate 103 is in contact with a common electrode plate 107.

By AC voltages equal in both amplitude and frequency being applied to the forward electrostrictive element plate 102 and the rearward electrostrictive element plate 103 with a phase difference in time therebetween, vibration comprising the combination of the vibration of the electrostrictive element plate 102 and the vibration of the electrostrictive element plate 103 is generated in the vibrator to thereby cause the fore end of the vibrator to effect circular motion.

FIG. 13 of the accompanying drawings shows a motor using such a vibrator as a drive source. The fore end of the vibrator is urged against the surface of a disk 108, and the disk 108 is frictionally driven by the circular motion of the fore end of the vibrator and a rotative force is output from a rotary shaft 109 fixed to the center of the disk 108.

Now, the motor utilizing such a vibrator utilizes the movement of the fore end portion of the vibrator, and according to my experiment, such motor has the difficulty that the rotational torque of the fore end portion of the vibrator is weak and a sufficient driving torque cannot be given to the disk which is a driven member.

The following two points have been considered to be the reasons therefor. The first point is that the fore end portion is a free end having no node at one side thereof and is low in rigidity and therefore sufficient vibration energy is not transmitted. The second point is that the free end which is the fore end is the loop of the vibration of rope skipping motion generating a circular motion (i.e., the vibration of a motion similar to the motion of the rope in rope skipping) and at the same time, the loop of the vibration in the axial direction. Therefore, the circular motion of the fore end in a plane perpendicular to the axis which is asserted by the aforementioned Japanese Patent Laid-Open Applications Nos. 62-141980 and 63-214381 does not actually take place and there is presented a form of frictional driving which is not smooth and in which the vibrator contacts the moving member only once per period of the vibration.

Also, in the case of such a motor in which the vibrator effects the aforedescribed vibration of rope skipping motion, it is necessary to give sufficient consideration also to the supporting of the driven member so that the motor may not become bulky.

SUMMARY OF THE INVENTION

It is an object of the present invention to provide an efficient and compact motor or actuator.

Other objects of the present invention will become apparent from the following detailed description of the invention.

In a preferred embodiment, a rotor driven by a vibrator which generates rope skipping motion has a friction portion which is in contact with the friction portion of the vibrator so as to be given rope skipping motion from the friction portion of the vibrator, and a supporting portion which is spaced apart from the friction portion and is in contact with a portion of said vibrator. Thus, the motor is constructed compactly.

DESCRIPTION OF THE PREFERRED EMBODIMENTS

Figure 1:
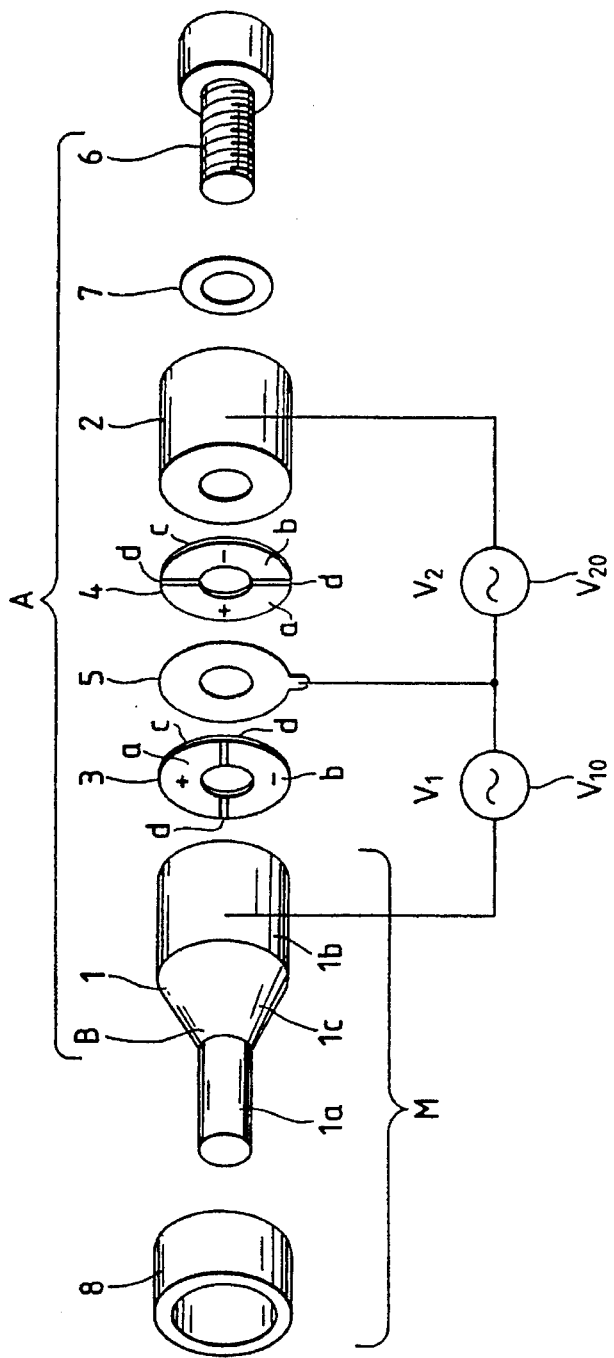
FIG. 1 is an exploded perspective view showing a first embodiment of a motor according to the present invention.

FIG. 1 is an exploded perspective view of a first embodiment of a motor according to the present invention.

The reference numeral 1 designates a vibration member comprising a metallic round bar having a cone-shaped horn portion 1c gradually decreasing in diameter toward the fore end portion thereof and formed between a small-diameter shaft portion 1a at the fore end and a large-diameter shaft portion 1b at the rear end. Reference numeral 2 denotes a keep member comprising a metallic round bar having a bolt-passing hole in the axis thereof formed so as to have an outer diameter equal to that of the large-diameter shaft portion 1b of the vibration member 1. Reference numerals 3 and 4 designate circular ring-shaped piezo-electric element plates formed with an outer diameter equal to that of the large-diameter shaft portion 1b, and the reference numeral 5 denotes the electrode plate of the piezo-electric element plates 3 and 4. Between the vibration member 1 and the keep member 2, the piezo-electric element plates 3 and 4 are disposed with the electrode plate 5 interposed therebetween, and the keep member 2 is fixed to the vibration member 1 by a bolt 6, whereby the piezo-electric element plates 3 and 4 are fixed between the vibration member 1 and the keep member 2, thus forming a vibrator A. The bolt 6 has its head brought into contact with the keep member 2 with a circular ring-like insulating member 7 interposed therebetween and has its shaft portion held in noncontact with the piezo-electric element plates 3, 4 and the electrode plate 5.

The piezo-electric element plate 3 has on one surface thereof two electrodes (plus (+) electrode a and minus (−) electrode b) symmetrically formed on the opposite sides of an insulating portion d formed on the center axis position. The two electrodes differ in the direction of polarization from each other are polarized in the direction of thickness, and have on the other surface thereof a common electrode c for + electrode a and − electrode b electrically connected to the common electrode plate 5. On the other hand, the piezo-electric element plate 4 has electrodes (+: electrode a and −: electrode b) disposed positionally 90° out of phase with each other relative to the electrodes of the piezo-electric element plate 3, and further has on the back thereof a common electrode for these electrodes. The polarized electrodes (+ electrode a and − electrode b) of the piezo-electric element plate 3 are in electrical contact with the rear end surface of the vibration member 1 which is an electrical conductor, and the piezo-electric element plate 4 is in contact with the fore end surface of the keep member 2 which is an electrical conductor.

An AC voltage $V_1$ is applied between the common electrode plate 5 and the vibrator 1 and an AC voltage $V_2$ is applied between the common electrode plate 5 and the keep member 2, whereby the vibrator A is vibrated by the combination of the vibration due to the expansion and contraction displacement of the piezo-electric element plate 3 in the direction of thickness thereof and the vibration due to the expansion and contraction displacement of the piezo-electric element plate 4 in the direction of thickness thereof.

Figure 2:
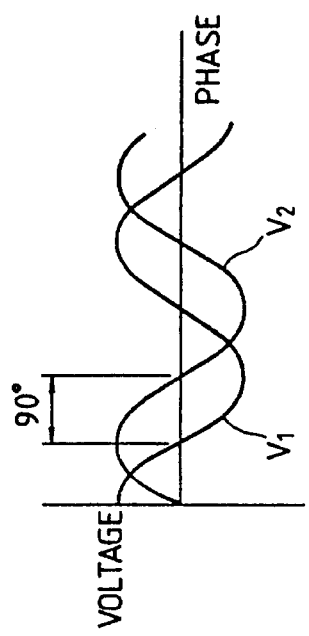
FIG. 2 shows the waveform of an AC power source applied to a piezo-electric element plate.

The AC voltage $V_1$ from an AC voltage source $V_{10}$ and the AC voltage $V_2$ from an AC voltage source $V_{20}$, as shown in FIG. 2, are equal in both amplitude and frequency and are 90° out of phase with each other in time and space.

Thus, the vibrator A effects circular motion like that of a rope of rope skipping (hereinafter referred to as "vibration of rope skipping motion") about the axis thereof. The principle on which such circular motion occurs is known and therefore need not be described herein.

Here, when it is assumed that the opposite ends of the vibrator A are free ends, the loops of the vibration of rope skipping motion are formed at the opposite ends of the vibrator A, and from the shape of the vibrator A, the diameter of the circular motion at the fore end of the vibration member 1 is larger than that at the rear end of the keep member 2, but as previously described, the torque in the circular motion at the fore end of the vibration member 1 is small.

In the present embodiment, the vibrator A is designed such that the position of the loop of the vibration of rope skipping motion lies at the sliding portion B of the horn portion 1c of the vibration member in the vibrator A, and the piezo-electric element plates 3 and 4 are driven by the resonance frequency of the vibrator A.

Figure 3A:
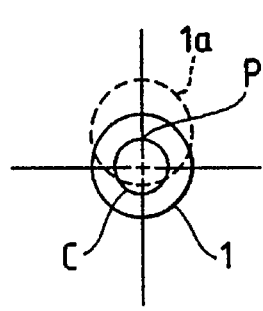
FIGS. 3A and 3B are a front view and a side view, respectively, showing a rope skipping motion of three nodes.
Figure 3B:
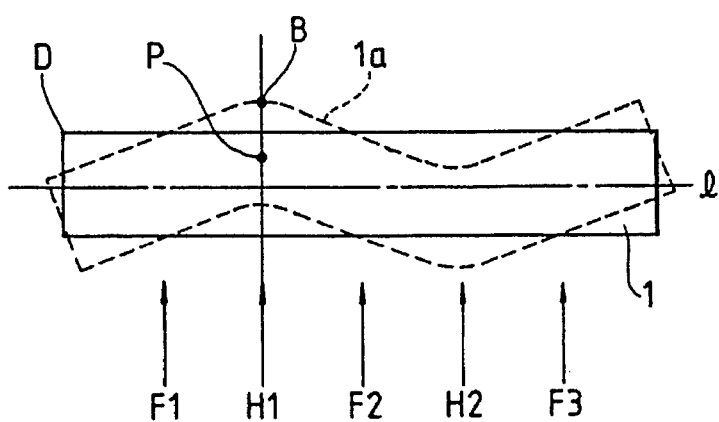

That is, the vibrator A vibrates in a mode of three or more nodes as considered in the mode of the vibration of rope skipping motion, and vibrates with at least the opposite ends and the sliding portion B of the vibrator A as the loops of this vibration mode. The vibration member 1 effects such rope skipping motion with the axis l of the vibration member 1 as the center as shown in FIGS. 3A and 3B, where the center point P of the loop (H1) of the vibration of rope skipping motion of the vibration member 1 moves on the circumference of a circle c, as shown in FIG. 3A. The rope skipping motion in the sliding portion B is utilized so that a rotor 8 which will be described later may be rotated about the axis l, and the torque obtained in this sliding portion B is greater than the torque obtained in the fore end portion D.

Figure 4:
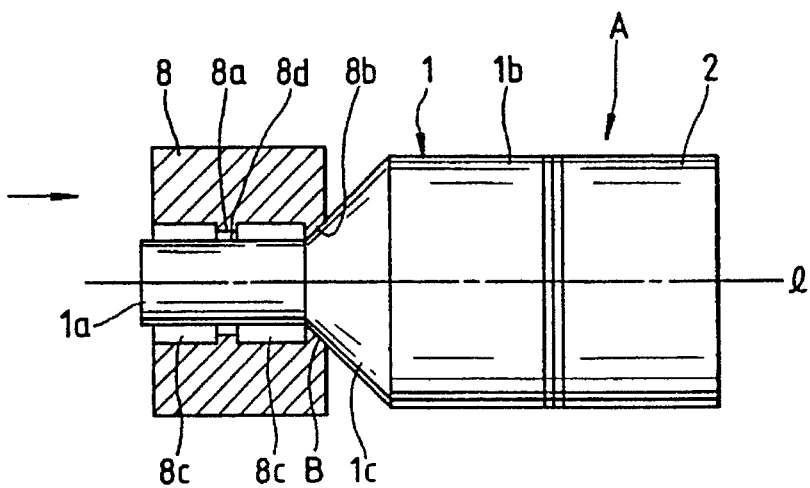
FIG. 4 shows the assembled state of the motor of the first embodiment.

As shown in FIG. 4, the rotor 8 as a driven member is fitted coaxially with the axis l of the vibrator A, the rear end portion (hereinafter referred to as "friction contact portion") 8b of the bore portion of the rotor 8 extends to a position corresponding to the sliding portion B, and the friction contact portion 8b bears against the sliding portion B of the horn portion 1c. This horn portion 1c is provided to receive an axial pressure force from the rotor 8 to thereby obtain an appropriate frictional force in the sliding portion B. This sliding portion B provides the loop of the vibration of rope skipping motion in the vibration member 1.

In the bore portion 8a of the rotor 8 provided at a location spaced apart from the contact portion 8b, a member 8d of low coefficient of friction which is in contact with the shaft portion 1a is provided at the position of the node of the vibration of rope skipping motion in the vibration member 1, and constitutes a support member for the rotor 8. The rotor 8 is provided with an escapement 8c to prevent sound from being produced relative to any vibration generated in portions other than the sliding portion B. This will be described later.

The friction contact portion 8b of the rotor 8 diverges into a shape in which the inner diameter thereof matching the outer peripheral shape of the sliding portion B increases gradually, and makes surface contact with the sliding portion B during the rope skipping motion of the vibration member 1.

The rotor 8 is pushed in the direction of the arrow in FIG. 4 by a spring or the like, not shown, for example, through a thrust bearing, not shown, to thereby produce a predetermined frictional force in the portion of contact between the friction contact portion 8b and the sliding portion B, and is permitted to be rotated in the axial direction by said thrust bearing.

Figure 5A:
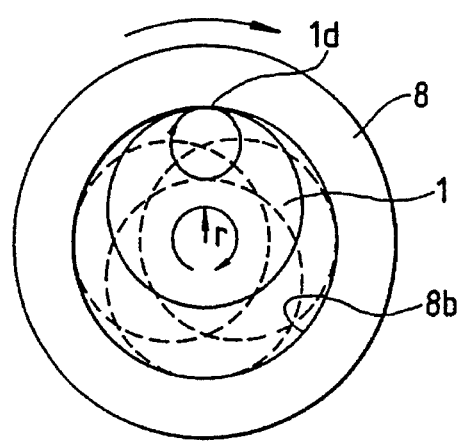
FIGS. 5A and 5B illustrate the principle of driving, FIG. 5A illustrating the principle on which a shaft effects rope skipping motion to rotate a hollow member, and FIG. 5B illustrating the principle on which a hollow vibration member effects rope skipping motion to rotate a shaft.

That is, when the vibrator A vibrates, for example, in a mode of three nodes in which the sliding portion B is the position of the loop of this vibration mode, as previously described, the vibration member 1 effects a rope skipping motion about the axis 1 as shown in FIG. 3, and as shown in FIG. 5A, the sliding portion B effects a circular motion describing a locus of a predetermined radius r in a clockwise direction or a counterclockwise direction relative to the axis 1 while making friction contact with the friction contact portion 8b of the rotor 8, thus rotating the rotor 8. That is, the rotor is driven by the same principle as the known planetary roller. In order to explain that the sliding portion B effects circular motion while rubbing against the inner peripheral surface of the friction contact portion 8b of the rotor, in FIG. 5A, the outer diameter of the sliding portion B is made considerably smaller than the inner diameter of the friction contact portion 8b of the rotor 8. However, the radius of the rope skipping motion in the sliding portion B is very slight and therefore, there is a minute clearance between the sliding portion B and the inner peripheral surface of the friction contact portion 8b of the rotor 8. The factors which determine this minute clearance are the acute angle of the cone-shape of the vibration member 1 and the amount of amplitude of the axial vibration in the sliding portion B.

Whereas in the principle of the drive transmission of the planetary roller, it is assumed that there is no slip between the sliding portion B and the friction contact portion 8b, when the vibration member 1 makes one full rotation by rope skipping motion, the rotor 8 rotates by an amount corresponding to the difference between the circumferential length of the sliding portion B and the circumferential length of the friction contact portion 8b of the rotor 8. Because of that principle, even if the vibration member 1 is effecting a rope skipping motion at a period as high as 20 KHz, the number of rotations of the rotor 8 is merely several hundred per minute at the most.

That is, noting any point 1d on the sliding portion of the vibration member 1, the point 1d effects a circular motion whose radius is determined by the aforementioned minute clearance, and contacts the inner peripheral portion of the rotor 8 in that process, thereby providing a frictional driving force for causing the rotor 8 to effect rotational motion.

Figure 5B:
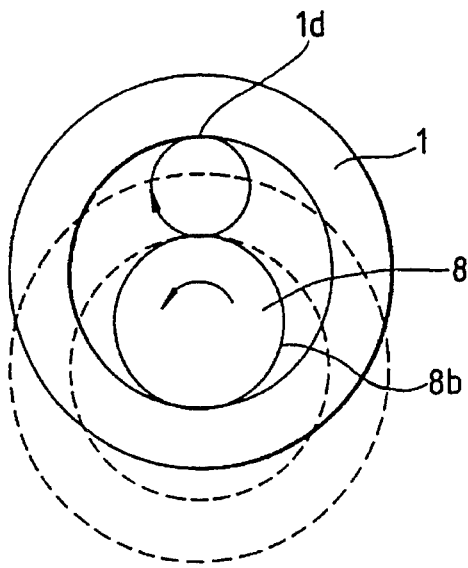

FIG. 5B, conversely to FIG. 5A, shows a case where the vibration member 1 is of a cylindrical shape and the rotor 8 rotates while making friction contact with the hollow inner side surface of the cylindrical vibration member 1. In this case, the direction of rotation of the vibration member and the direction of rotation of the rotor are opposite to each other.

On the other hand, the rotor 8 is provided with an escapement 8c, and the role of this escapement to make the friction contact portion 8b uniformly contact the sliding portion 1c. That is, if the inner peripheral portion 8a of the rotor 8 is too long, such that the supporting portion which contacts the small diameter shaft portion 1a of the vibration member 1 becomes long, the clearance between the small-diameter shaft portion 1a and the inner peripheral portion 8a will become small. Therefore, it will be difficult for the friction contact portion 8b and the sliding portion B to contact each other uniformly within the allowable range of the angle of inclination of the axis of the rotor 8 with respect to the axis 1 of the vibration member. Thus, a sound will be produced. So, even an attempt to solve this problem by making the clearance large would cause the rotor 8 to rotate with its axis inclined. That is, to solve the above-noted problem, there must be an appropriate positional relation between the small-diameter shaft portion 1a and the inner peripheral portion 8a of the rotor. As a result of my experiment, it has been found that it is preferable that the inner peripheral portion 8a of the rotor be set at the position of the node of the vibration of rope skipping motion of the vibration member 1 with a low friction member 8d interposed between it and the small-diameter shaft portion 1a. At the position of this node, no drive force is provided to the rotor and the provision of the inner peripheral portion 8a of the rotor in this node portion simply serves as a support. Therefore, no sound is produced. On the other hand, if the inner peripheral portion 8a is set at the position of the loop of the vibration of rope skipping motion in the vibration member 1, a drive force mismatching the originally necessary drive force in the sliding portion B may be provided to the rotor 8, thus producing a sound.

Now, the vibrator A is not such that only the vibration member 1 vibrates, but is such that the whole of it vibrates. Therefore, how to support the vibration A relative to an instrument or the like poses a problem when mounting the motor M on the instrument or the like.

In such case, supporting the vibrator A at the position of the node of this vibration mode apparently seems to be best suited because of its small amplitude. However, since the vibrator A is effecting a rope skipping motion starting from the position of the node of this vibration mode, the plane perpendicular to the axis 1 at the position of the node of this vibration mode oscillates along the direction of the axis 1.

Therefore, if a flange for mounting the motor is extended at a location which provides the position of the node of this vibration mode in the vibrator A, for example, on the outer peripheral surface of the vibration member 1 or the keep member 2, the vibrator will not vibrate at all when the fixing method is firm. On the other hand, if a supporting method in which the attenuation of vibration is suppressed with a member like a spring interposed between the vibration member and the flange is adopted, the flange may oscillate in the axial direction thereof and the portion mounted on the instrument or the like may be destroyed by vibration in the worst case, and the position of the node of this vibration mode is not suitable for supporting the vibrator A.

So, I have studied the vibrating state of the vibrator A and have found that the position of the loop of this vibration mode which apparently seems to be unsuitable as the supporting position for the vibrator A is suitable.

Figure 6A:
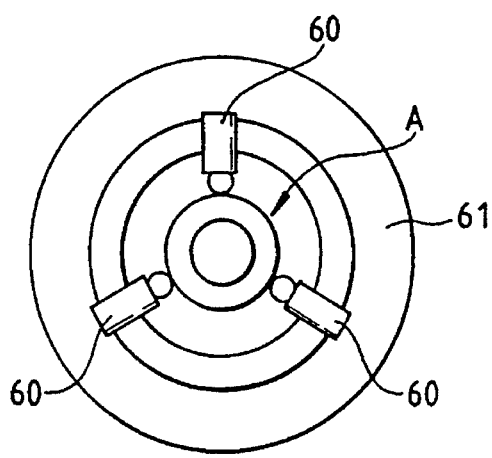
FIGS. 6A and 6B are a front view and a side cross-sectional view, respectively, showing a flangeless vibrator as it is supported by three bolts each having a ball-like tip end.
Figure 6B:
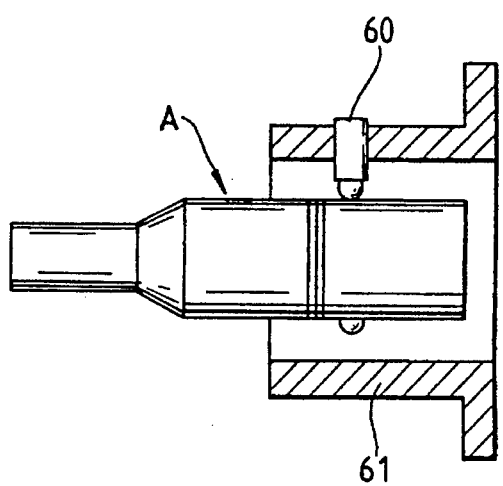

That is, at the position of the loop of this vibration mode, the amplitude is great, but displacement takes place only in the radial direction. Therefore, there will not occur a drawback attributable to the oscillating motion as described above. Also, the position of the loop of this vibration mode which provides the supporting position is naturally provided axially rearwardly of the sliding portion B from the structure of the motor M, and when the vibrator A is vibrated by a three-node mode, there is only one location which is best suited as the supporting position. This is because although there are a total of four positions of the loops in this vibration mode, i.e., the opposite ends of the vibration member and two locations therebetween, the opposite ends are greatest in axial vibration and worst for fixed supporting, and one of the two loops of the vibration of rope skipping motion between the opposite ends is used as the sliding portion. It has also been found that in the structure as shown in FIG. 6A wherein the vibrator A is provided with no flange and is fixedly supported by three bolts 60 or the like each having a spherical fore end with the aid of a supporting cylinder 61, the positions which provide loops in the vibration of rope skipping motion are good positions which do not impede vibration as supporting positions.

That is, the amplitude of the vibration in the vibrator A is very small and the amplitude at the positions of the loops of this vibration mode which provide these supporting positions is still smaller than the amplitude in the sliding portion B which effects the driving of the rotor 8. Therefore, the radial displacement can be almost neglected, and by using the positions of the loops in the direction of vibration as the supporting positions for the vibrator A, it becomes possible to support the vibrator A stably on the instrument or the like.

FIGS. 7A–7E show the results of experiments confirming the aforedescribed principle of rotation.

Figure 7A:
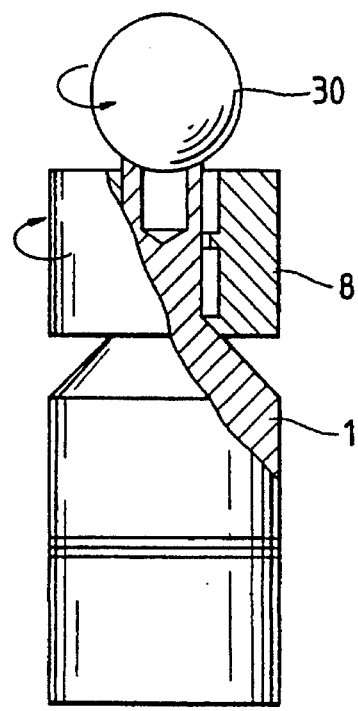
FIGS. 7A, 7B, 7C, 7D, 7E and 7F are views for confirming the principle of rotation.
Figure 7B:
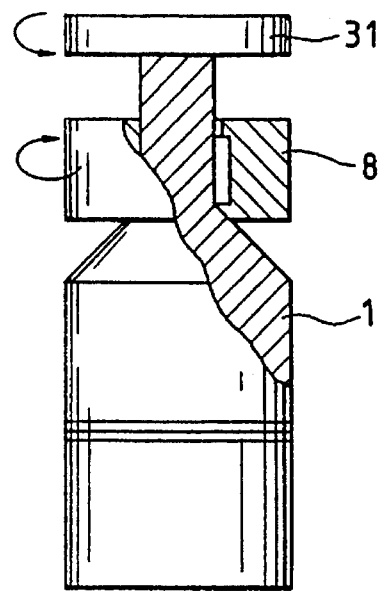
Figure 7C:
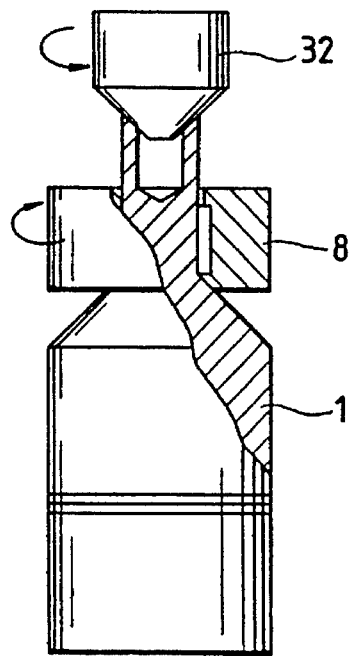

FIG. 7A shows the result of a test in which the direction of rotation was examined when the fore end of the vibration member 1 was made hollow and a metal ball 30 was placed thereon. The metal ball is rotating in the direction opposite to the direction of rotation of the rotor 8 underlying it. This is because the metal ball 30 is in contact with the inner peripheral surface of the hollow portion at the fore end of the vibration member 1, and is the same as the principle already described in connection with FIG. 5B. FIG. 7B shows the result of an experiment which shows that the direction of rotation when a disk-like metal plate 31 is placed on the fore end of the vibration member is opposite to the direction of rotation of the rotor 8 underlying it. The principle of this is shown in FIG. 7E. In FIG. 7E, it is seen that when the sliding portion B of the vibration member 1 moves toward the other side relative to the plane of the drawing sheet, a point 1e which is in contact with the metal plate 31 at the fore end of the vibration member 1 is the loop of vibration, like the sliding portion B. Therefore, if the plane of the drawing sheet is regarded as a neutral plane, it moves toward this side relative to the plane of the drawing sheet. FIG. 7C shows the direction of rotation when a rotor 32 having a convex cone-shaped portion is placed on the fore end portion of the same vibration member 1 as that shown in FIG. 7A. Again in this case, the rotor 32 rotates in the direction opposite to the direction of rotation of the rotor 8 underlying it, but the principle of it is the same as that described in connection with FIG. 5B.

Figure 7D:
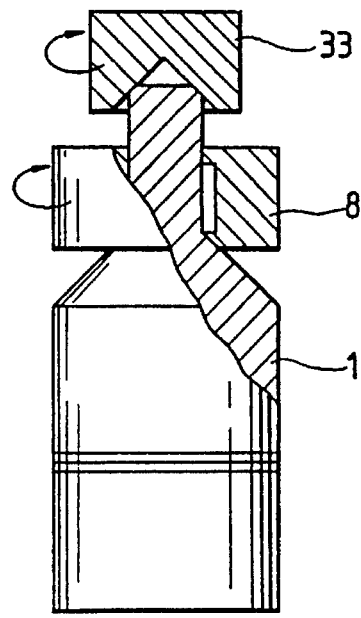
Figure 7E:
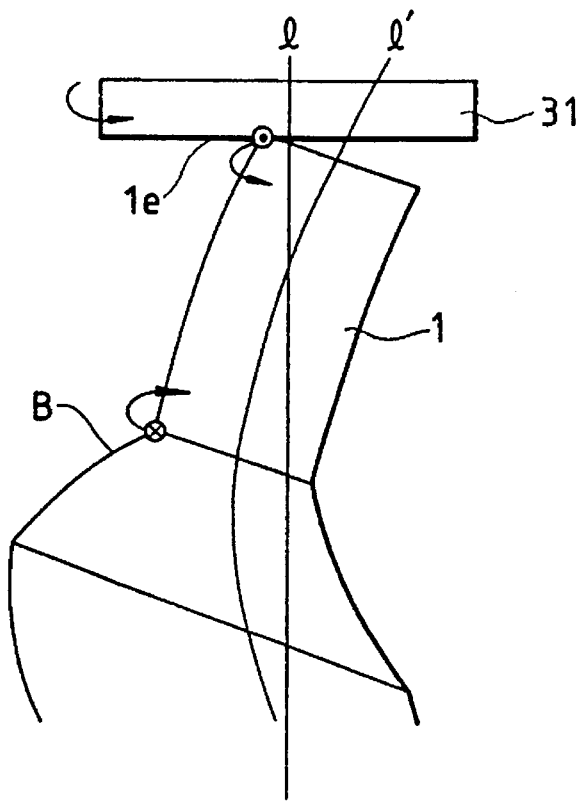
Figure 7F:
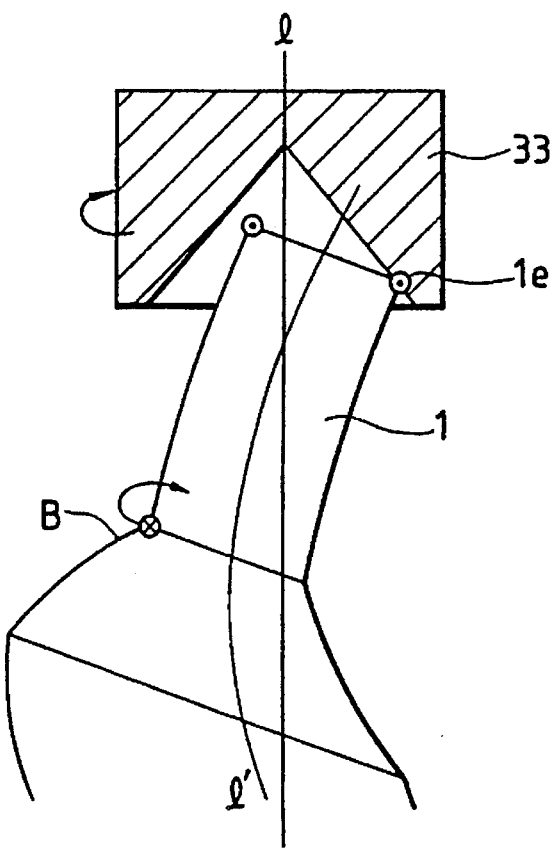

FIG. 7D shows the direction of rotation when a rotor 33 having a concave conical portion is placed on the fore end of the vibration member 1. This rotor 33 rotates in the same direction as the rotor 8 underlying it. The principle of this is shown in FIG. 7F. That is, it is seen that when the sliding portion B of the vibration member 1 moves toward the other side relative to the plane of the drawing sheet, the portion 1e of the fore end which is in contact with the rotor 33 moves toward this side relative to the plane of the drawing sheet.

Figures 8A, 8B, 8C:
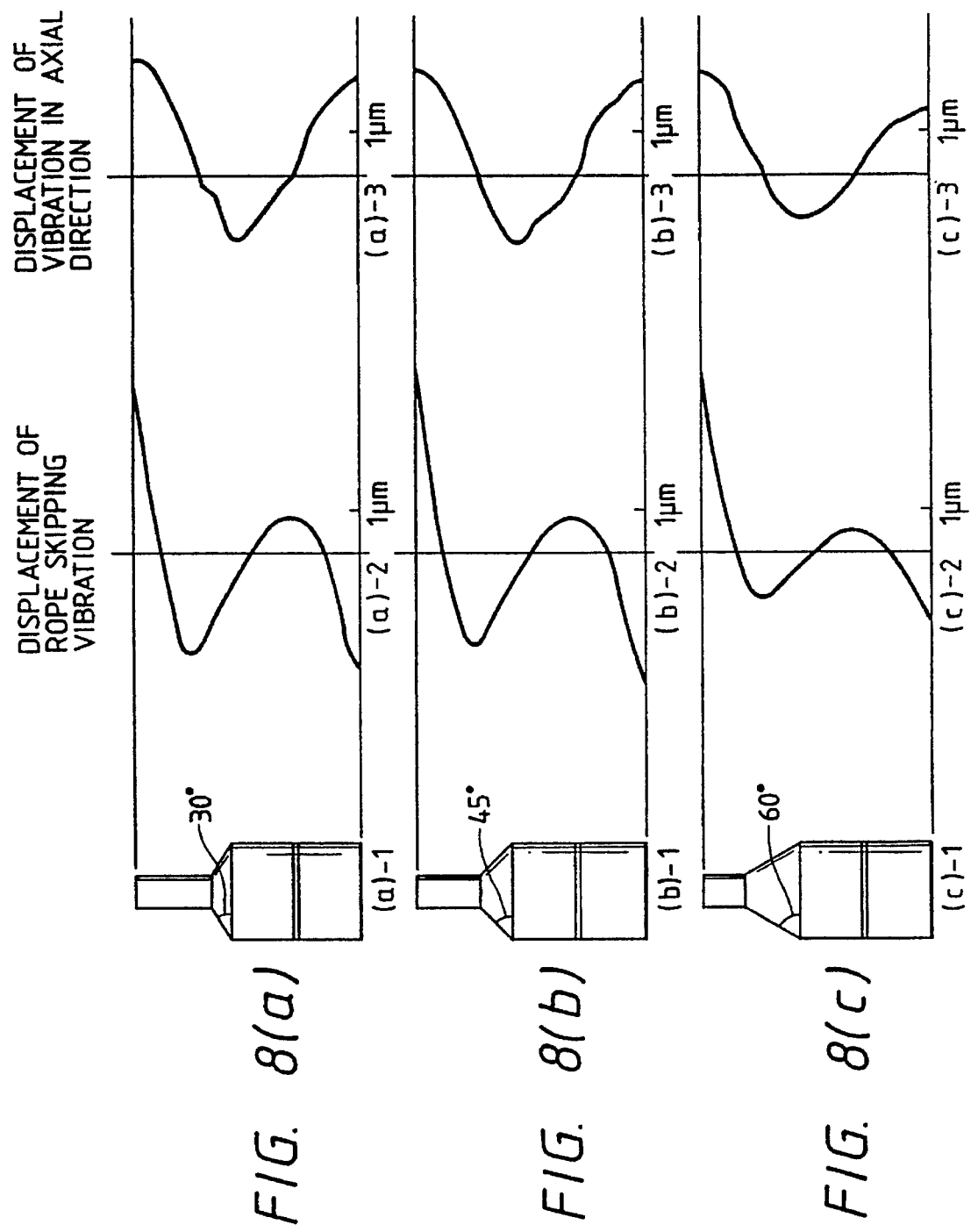
FIG. 8 shows the relation with the positions of a vibrator with respect to the displacement of rope skipping vibration and the displacement of vibration in the axial direction.

In FIG. 8, (a)-1, (b)-1 and (c)-i are side views of vibrators whose cone-shaped portions are at 30°, 45° and 60°, respectively, and (a)-2, (b)-2 and (c)-2 show the relations between the amount of displacement of rope skipping vibration and the axial position of the vibrator. Also, FIGS. 8(a)-3, (b)-3 and (c)-3 show the relations between the amount of displacement of the vibration in the axial direction and the axial position of the vibrator. The vibration conditions were 35.0 KHz, 35.5 KHz and 35.8 KHz for the vibrators (a)-1, (b)-i and (c)-1, respectively, and the applied voltages were all 100 $V_{p-p}$. A photo sensor was used for the measurement of the amount of displacement. As a result of the measurement, the rope skipping vibration is in a three-node vibration mode, and the vibration in the axial direction is in a two-node vibration mode. The positions of the loops of the rope skipping vibration substantially coincided with the positions of the nodes of the vibration in the axial direction. The amount of displacement was greater in the thinner portion of the vibrator, and as regards the amount of displacement of the small-diameter part of the fore end portion, both the rope skipping vibration and the vibration in the axial direction exhibited a maximum amount of displacement in the case of any vibrator.

It has been found that depending on the difference in the axial position, there are broadly three kinds of differences in the form of vibration. That is, the first is the position of the open end, and this is the position which provides a loop both in the rope skipping vibration and in the vibration in the axial direction. The second is the position of the node of the rope skipping vibration, and this position substantially coincides with the position of the loop in the vibration in the axial direction. The third is the position of the loop of the rope skipping vibration, and this position substantially coincides with the position of the node in the vibration in the axial direction.

When optimum positions relative to the positions of the aforementioned three kinds of forms of vibration have been examined with respect to the functions necessary as a motor, i.e., effectively transmitting the drive force to the moving member and providing the fixedly supporting position, it has been found that the sliding portion with the moving member is optimally the position of the loop of the rope skipping vibration, while the position for fixedly supporting the vibrator relative to the external system of vibration is optimally the position of the loop of the rope skipping vibration, i.e., the position which provides the node of the vibration in the axial direction. It has been found that the open end of the vibrator substantially provides the position of the loop both in the rope skipping vibration and in the vibration in the axial direction and is worst as the fixedly supporting position. Also, as previously described, the open end is effecting circular motion with a certain inclination with respect to a plane perpendicular to the axis of the vibrator. Therefore, the sliding portions of the moving member and the vibration member are repeating contact and separation therebetween and are not effecting smooth friction driving. Further, if an attempt is made to apply the open end to the sliding portion of the moving member, the guide portion of the moving member cannot be provided on a portion of the vibration member, and it is necessary to resort to a member which is an external system, to the vibration of the vibrator. This is because if an attempt is made to mount, for example, a bolt or the like on a portion of the vibrator and guide the moving member, the vibration mode of the vibrator will change. Here, supplementally describing the supporting portion 8d, in the motor of the present invention, it is the condition of the supporting portion 8d that the space between the sliding portion of the vibration member and the open end of the vibration member which is nearest thereto can be intactly utilized for the supporting portion 8d of the moving member. That is, the supporting portion 8d has the function of continuing to impart to the moving member an axis coaxial with the axis of the vibration member.

Second Embodiment

Figure 9A:
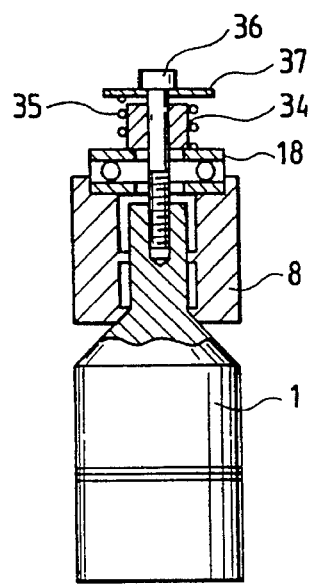
FIGS. 9A, 9B and 9C are cross-sectional views of a second embodiment of the present invention.
Figure 9B:
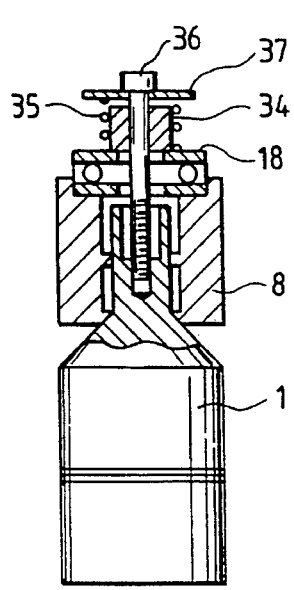
Figure 9C:
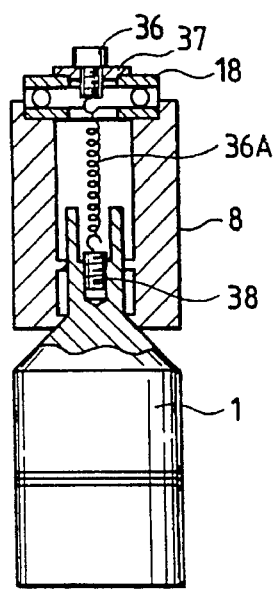

FIGS. 9A, 9B and 9C are cross-sectional views of a second embodiment, and the motors shown in these figures are ones in which the system for urging the moving member against the vibration member is changed. The motors of FIGS. 9A and 9B are basically identical in structure, and in these figures, the reference numeral 18 designates a thrust bearing, and the reference numeral 34 denotes a spring guide member adapted so that a spring may not be eccentric relative to the axis of the spring guide member. The reference numeral 35 designates a spring for urging the rotor 8 against the vibration member 1 by the expanding force of the spring when compressed. The reference numeral 36 denotes a bolt threadably engaged with the vibration member 1, and the reference numeral 37 designates a washer. In the system of FIG. 9A, the bolt is mounted in the open end of the vibration member 1 and therefore, the bolt may readily be loosened by vibration. In the system of FIG. 9B, the bolt mounting portion is at the position of the node of the vibration member and, therefore, the bolt will never be loosened. FIG. 9C shows a system in which a spring 36A is provided within the rotor to save space, and this system is of such structure that the spring 36A is tensioned between bolts 36 and 38 each having a hook and the contracting force of the spring 36A when expanded is utilized to urge the rotor 8 against the vibration member 1.

Third Embodiment

Figure 10:
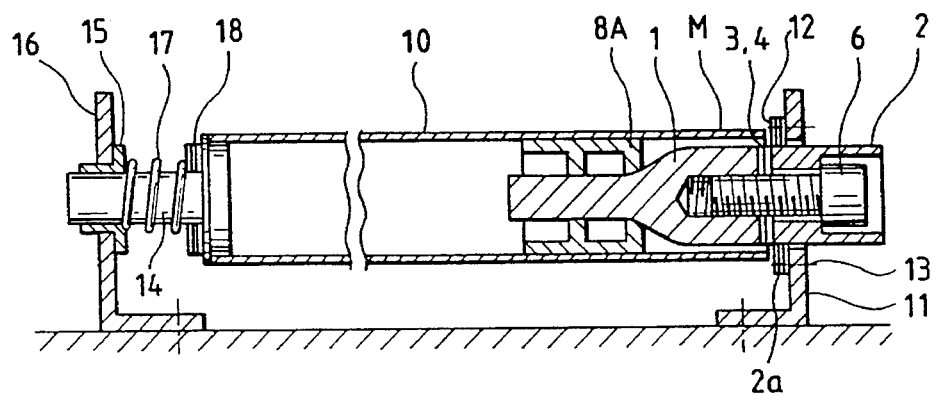
FIG. 10 is a cross-sectional view of a third embodiment of the present invention.

FIG. 10 is a cross-sectional view of a third embodiment.

This embodiment uses as a drive source for driving the platen roller of a printer a motor M of the same structure as the motor M in the first embodiment except for the shape of a rotor 8A and the supporting mechanism for the motor M. The motor M comprising a vibrator A and the rotor 8A is contained in one end portion of the platen roller 10. This motor M is used also as a support shaft on one end side of the platen roller 10.

The motor M is such that a portion thereof which provides the loop position of vibration is supported by the peripheral portion of a keep member 2 for the vibrator A. A mounting flange portion 2a is provided on said portion and this flange portion 2a is mounted on the mounting frame 11 of the printer with a low friction sheet 12 formed of a low friction material such as Teflon (trademark) being sandwiched therebetween. A screw 13 having a shank of a smaller diameter than the inner diameter of a hole (not shown) formed in the flange portion 2a is threaded into said hole, and this screw 13 is threadably coupled to the mounting frame 11, thereby restricting the movement of the motor M in the axial direction thereof, but permitting the expansion and contraction of the flange portion 2a in the radial direction thereof.

The platen roller 10 is non-rotatably fitted to the rotor 8A of the motor M contained in the platen roller so that the rotational force of the rotor 8A may be directly transmitted to the platen roller, and a support shaft 14 fixed to the other end side is journalled to the mounting frame 16 of the printer for rotation and axial movement through a bearing member 15. A spring 17 is resiliently mounted on the support shaft 14, and one end of the spring 17 bears against a thrust bearing 18 and the other end of the spring 17 bears against the bearing member 15, and by the spring force of the spring 17, the rotor 8A is urged against the vibrator A and the roller 10 is made rotatable.

Fourth Embodiment

Figure 11:
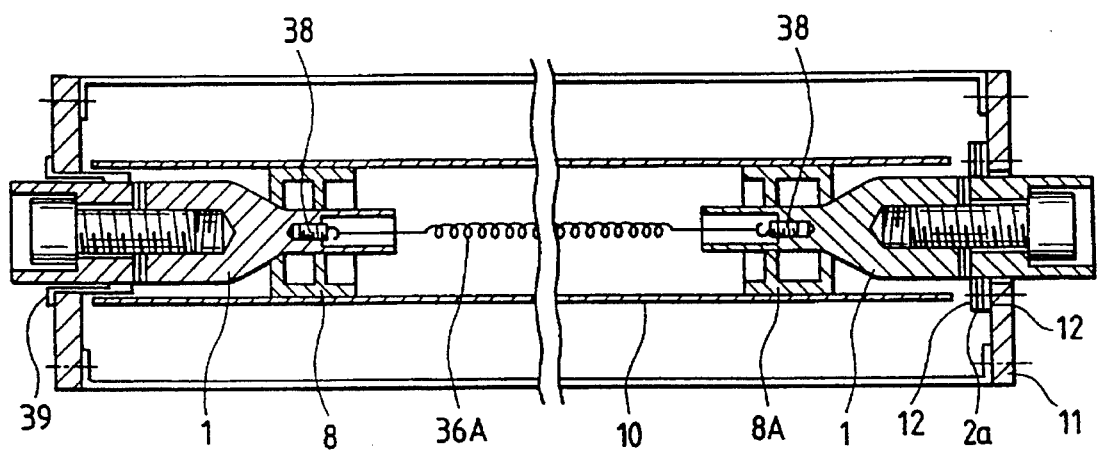
FIG. 11 is a cross-sectional view of a fourth embodiment of the present invention.
Figure 12:
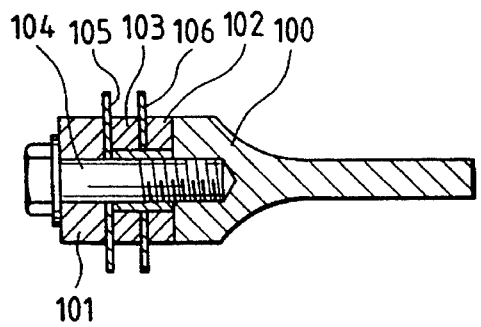
FIG. 12 is a cross-sectional view showing a vibrator according to the prior art.
Figure 13:
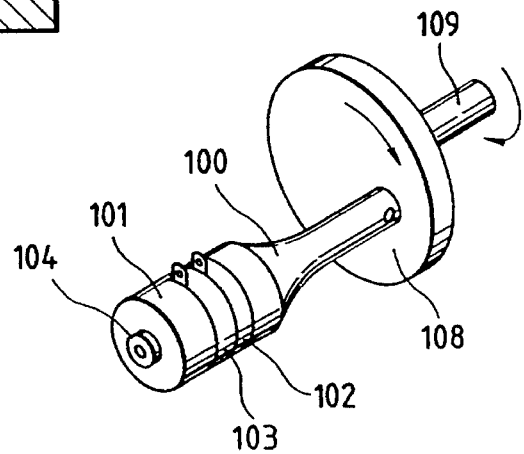
FIG. 13 is a perspective view of a motor utilizing the vibrator according to the prior art.

FIG. 11 is a cross-sectional view of a fourth embodiment. This embodiment is the same as the third embodiment in use, and is of such structure that two motors M of the first embodiment are used as a drive source for the platen roller of a printer. As in the third embodiment, a fixedly supporting flage portion 2a is provided on one of the two motors at the same position thereon, and said one motor is fixed to a frame 11 by the flange portion 2a.

The other motor is fitted to the frame 11 through a bush 39 so that the motor is freely movable in the axial direction thereof, but the vibrators themselves are prevented from rotating by a key (not shown). Further, the two vibrators have the vicinities of their fore end portions connected together by a spring 36A in the same manner as in the system of FIG. 9C, and by the contacting force of this spring 36A, said two vibrators are urged against respective rotors 8A.

As has hitherto been described, according to the present invention, the fore end portion of the vibrator is not utilized to form the position of the loop of a rope skipping vibration in the horn portion, and the circular motion of the horn portion is utilized to rotate the moving member and therefore, the moving member can be driven with a great torque.

In addition, in the present invention, the rotor as the driven member is brought into contact with the vibration member at two points, i.e., the drive force transmitting portion of the vibration member and other portion spaced apart from said portion. Therefore, the supporting structure for the rotor becomes simple and thus, there can be provided a compact motor or actuator.

We claim:

1. A vibration driven motor, comprising:

a vibration member having a frictional contact surface;

a hollow movable member having a hollow portion including a frictional contact surface which is in frictional contact with the frictional contact surface of said vibration member to receive a combined vibration therefrom, a portion of said vibration member being disposable in an inner portion of said hollow portion;

an electromechanical energy conversion member attached to the vibration member, for producing a combined vibration in the vibration member in response to an applied electrical signal, said conversion member having a first electromechanical energy conversion element which generates a first bending vibration in a first plane and a second electromechanical energy conversion element which generates a second bending vibration in a second plane different from the first plane, the combined vibration of the two vibrations causing relative movement between the vibration member and the movable member; and a bias member provided in the hollow portion of said movable member, for applying a frictional contact force between said vibration member and said movable member.

2. A vibration driven motor according to claim 1, wherein the first plane is substantially perpendicular to the second plane.

3. A vibration driven motor according to claim 1, wherein said bias member includes a spring.

4. A vibration driven motor according to claim 3, wherein said spring has one end fixed to said vibration member and has another end fixed to a supporting member.

5. A vibration driven motor, comprising:

a vibration member including means for generating therein a first bending vibration along a first direction and a second bending vibration along a second direction different from the first direction, a combined vibration of the first and second bending vibrations being generated therein;

a hollow contact member arranged in frictional contact with said vibration member to receive the combined vibration therefrom, the combined vibration causing relative movement between the vibration member and the contact member, wherein said hollow contact member has a hollow portion, and a portion of said vibration member is disposable in an inner portion of said hollow portion; and a bias member provided within the hollow portion of said contact member, for applying a frictional contact force between said vibration member and said contact member.

6. A vibration driven motor according to claim 5, wherein the second direction is substantially perpendicular to the first direction.

7. A vibration driven motor according to claim 6, wherein said bias member includes a spring.

8. A vibration driven motor according to claim 7, wherein said spring has one end fixed to said vibration member and has another end fixed to a supporting member.

9. A vibration driven motor according to claim 8, further comprising:

a bearing for rotatably supporting said contact member, said bearing being provided between said vibration member and said supporting member.

10. A vibration driven motor according to claim 9, wherein said bearing is a thrust bearing contacting a side of said contact member opposite said vibration member.

11. A vibration driven motor according to claim 7, wherein said vibration member includes a hollow portion at a free end thereof, and wherein said spring extends through the hollow portion of said vibration member.

12. A printer comprising a platen rotatably driven by a vibration driven motor as claimed in any one of claims 1 to 11.

13. A vibration driven motor, comprising:

a vibration member having a frictional contact surface;

a hollow movable member having a hollow portion and a frictional contact surface which is in frictional contact with the frictional contact surface of said vibration member to receive a combined vibration therefrom; and an electromechanical energy conversion member attached to the vibration member, for producing a combined vibration in the vibration member in response to an applied electrical signal, said conversion member having a first electromechanical energy conversion element which generates a first bending vibration in a first plane and a second electromechanical energy conversion element which generates a second bending vibration in a second plane different from the first plane, the combined vibration of the two vibrations causing relative movement between the vibration member and the movable member; and a bias member provided in the hollow portion of said movable member, for applying a frictional contact force between said vibration member and said movable member, said bias member including a spring having one end fixed to said vibration member and another end fixed to a supporting member.

14. A vibration driven motor according to claim 13, wherein the first plane is substantially perpendicular to the second plane.

15. A vibration driven motor, comprising:

a vibration member including means for generating a first bending vibration along a first direction and a second bending vibration along a second direction different from the first direction, a combined vibration of the first and second bending vibrations being generated therein;

a hollow contact member having a hollow portion and arranged in frictional contact with said vibration member to receive the combined vibration therefrom, the combined vibration causing relative movement between the vibration member and the contact member; and a bias member provided within the hollow portion of said contact member, for applying a frictional contact force between said vibration member and said contact member, said bias member including a spring having one end fixed to said vibration member and another end fixed to a supporting member.

16. A vibration driven motor according to claim 15, wherein the second direction is substantially perpendicular to the first direction.

17. A vibration driven motor according to claim 16, further comprising:

a bearing for rotatably supporting said contact member, said bearing being provided between said vibration member and said supporting member.

18. A vibration driven motor according to claim 17, wherein said bearing is a thrust bearing contacting a side of said contact member opposite said vibration member.

19. A vibration driven motor, comprising:

a vibration member including means for generating a first bending vibration along a first direction and a second bending vibration along a second direction different from the first direction, a combined vibration of the first and second bending vibrations being generated therein, said vibration member including a hollow portion at a free end thereof;

a hollow contact member having a hollow portion and arranged in frictional contact with said vibration member to receive the combined vibration therefrom, the combined vibration causing relative movement between the vibration member and the contact member; and a bias member provided within the hollow portion of said contact member, and including a spring for applying a frictional contact force between said vibration member and said contact member.

20. A vibration driven motor according to claim 19, wherein the second direction is substantially perpendicular to the first direction.

21. A printer comprising a platen rotatably driven by a vibration driven motor as claimed in any one of claims 13 to 20.

22. A vibration driven motor, comprising:

a vibration member having a frictional contact surface;

a hollow movable member including a hollow portion and having a frictional contact surface which is in frictional contact with the frictional contact surface of said vibration member to receive a combined vibration therefrom, a portion of said vibration member being disposable in an inner portion of said hollow portion;

an electromechanical energy conversion member attached to the vibration member, for producing a combined vibration in the vibration member in response to an applied electrical signal, said conversion member having a first electromechanical energy conversion element which generates a first bending vibration in a first plane and a second electromechanical energy conversion element which generates a second bending vibration in a second plane different from the first plane, the combined vibration of the first and second vibrations causing the frictional contact surface of said vibration member to move in a continuous orbital movement about an axis of said vibration member, thereby causing relative movement between the vibration member and the movable member; and a bias member provided in the hollow portion of said movable member, for applying a frictional contact force between said vibration member and said movable member.

23. A vibration driven motor, comprising:

a vibration member having a contact surface and means for generating therein a first bending vibration along a first direction and a second bending vibration along a second direction different from the first direction, a combined vibration of the first and second bending vibrations being generated therein, whereby the contact surface of said vibration member moves in a continuous orbital movement about an axis of said vibration member;

a hollow contact member having a hollow portion and arranged in frictional contact with the contact surface of said vibration member to receive the combined vibration therefrom, the combined vibration causing relative movement between the vibration member and the contact member; and a bias member provided within the hollow portion of said contact member, for applying a frictional contact force between said vibration member and said contact member.

24. A vibration driven motor according to claim 23, wherein the second direction is substantially perpendicular to the first direction.

25. A vibration driven motor according to claim 24, wherein said bias member includes a spring.

26. A vibration driven motor according to claim 25, wherein said spring has one end fixed to said vibration member and has another end fixed to a supporting member.

27. A vibration driven motor according to claim 26, further comprising:

a bearing for rotatably supporting said contact member, said bearing being provided between said vibration member and said supporting member.

28. A vibration driven motor according to claim 27, wherein said bearing is a thrust bearing contacting a side of said contact member opposite said vibration member.

29. A vibration driven motor according to claim 27, wherein said vibration member includes a hollow portion at a free end thereof, and wherein said spring extends through the hollow portion of said vibration member.

* * * * *

UNITED STATES PATENT AND TRADEMARK OFFICE
CERTIFICATE OF CORRECTION

PATENT NO. : 5,506,462
DATED : April 9, 1996
INVENTOR(S) : JUN TAMAI, ET AL.

It is certified that error appears in the above-indentified patent and that said Letters Patent is hereby corrected as shown below:

<u>At Column 3</u>

Line 45, "other" should read --other,--.

<u>At Column 4</u>

Line 32, "center" should read --center,--.

<u>At Column 5</u>

Line 34, "is-no" should read --is no--.

<u>At column 7</u>

Line 9, ". impede" should read --impede--.
Line 60, "(c)-i" should read --(c)-1--.

UNITED STATES PATENT AND TRADEMARK OFFICE
CERTIFICATE OF CORRECTION

PATENT NO. : 5,506,462
DATED : April 9, 1996
INVENTOR(S) : JUN TAMAI, ET AL.

It is certified that error appears in the above-indentified patent and that said Letters Patent is hereby corrected as shown below:

<u>At Column 8</u>

Line 1, "(b)-i" should read --(b)-1--.

<u>At Column 14</u>

Line 21, "claim 27," should read --claim 25,--.

Signed and Sealed this

Thirtieth Day of July, 1996

Attest:

BRUCE LEHMAN

*Attesting Officer*     *Commissioner of Patents and Trademarks*